(12) United States Patent
Vorias (10) Patent No.: US 12,498,561 B2
(45) Date of Patent: Dec. 16, 2025

(54) THERMAL IMAGING ASSEMBLY (71) Applicant: GLOBAL CLEAN COAL TECHNOLOGIES PTY LTD, Seventeen Mile Rocks (AU)

(72) Inventor: Richard Vorias, Seventeen Mile Rocks (AU)

(73) Assignee: GLOBAL CLEAN COAL TECHNOLOGIES PTY LTD, Seventeen Mile Rocks (AU)

( * ) Notice: Subject to any disclaimer, the term of this patent is extended or adjusted under 35 U.S.C. 154(b) by 21 days.

(21) Appl. No.: 18/561,033

(22) PCT Filed: May 17, 2022

(86) PCT No.: PCT/AU2022/050471
§ 371 (c)(1),
(2) Date: Nov. 15, 2023

(87) PCT Pub. No.: WO2022/241511
PCT Pub. Date: Nov. 24, 2022

(65) Prior Publication Data
US 2024/0255752 A1 Aug. 1, 2024

(30) Foreign Application Priority Data

May 17, 2021 (AU) ................................ 2021203154

(51) Int. Cl.
*H04N 23/23* (2023.01)
*B08B 3/02* (2006.01)
*G01J 5/05* (2022.01)
*G01J 5/10* (2006.01)
*G01J 5/48* (2022.01)
(Continued)

(52) U.S. Cl.
CPC ............ *G02B 27/0006* (2013.01); *B08B 3/02* (2013.01); *G01J 5/05* (2022.01); *G01J 5/10* (2013.01);
(Continued)

(58) Field of Classification Search
None
See application file for complete search history.

(56) References Cited

U.S. PATENT DOCUMENTS

2003/0155001 A1 8/2003 Hoetzer et al.
2009/0084409 A1* 4/2009 Okura ............... H01L 21/67253
134/99.1
(Continued)

FOREIGN PATENT DOCUMENTS

AU 2014101394 A4 1/2015
WO 2020021984 A1 1/2020

OTHER PUBLICATIONS

International Search Report and Written Opinion for International Application No. PCT/AU2022/050471, mailed Aug. 5, 2022; 10 pages.

(Continued)

*Primary Examiner* — Eileen M Adams
(74) *Attorney, Agent, or Firm* — HAYNES AND BOONE, LLP (57) ABSTRACT

A thermal imaging apparatus comprising: a housing with a front wall having a first aperture extending therethrough, a rear wall spaced from the front wall, side walls connecting the front and rear walls; a thermal imaging camera mounted within the internal chamber of the housing, a camera lens aligned with the first aperture; and a fluid injection portion connected to the internal chamber that directs fluid towards the lens to clean the lens. Alternatively the housing defines first and second internal chambers spaced along a longitudinal axis of the apparatus separated by an internal wall comprising a second aperture extending therethrough; where the thermal imaging camera is mounted within the second internal chamber, with the camera lens aligned with the two apertures. Gas and fluid injection portions are connected to (Continued)

the first internal chamber to direct gas into the first chamber; and fluid towards the lens to clean the lens.

20 Claims, 7 Drawing Sheets (51) Int. Cl.
G02B 27/00 (2006.01)
G03B 17/02 (2021.01)
H04N 7/18 (2006.01)
H04N 23/51 (2023.01)
G01J 5/00 (2022.01)

(52) U.S. Cl.
CPC ............... *G01J 5/48* (2013.01); *G03B 17/02* (2013.01); *H04N 7/183* (2013.01); *H04N 23/23* (2023.01); *H04N 23/51* (2023.01); *G01J 2005/0077* (2013.01)

(56) References Cited

U.S. PATENT DOCUMENTS

| | | | |
|---|---|---|---|
| 2015/0059808 A1* | 3/2015 | Yu | H01L 21/02041 134/33 |
| 2015/0185592 A1* | 7/2015 | Eineren | G03B 17/08 348/375 |
| 2020/0354828 A1* | 11/2020 | Gurary | C23C 16/0227 |
| 2020/0393550 A1 | 12/2020 | Hamilton et al. | |
| 2021/0094079 A1 | 4/2021 | Krishnan et al. | |

OTHER PUBLICATIONS

Extended European Search Report for related European Patent Application No. EP22803472.4, dated Mar. 7, 2025, 9 pages.

* cited by examiner

THERMAL IMAGING ASSEMBLY

CROSS REFERENCE

This application is a United States national phase application of International Patent Application Number PCT/AU2022/050471, filed May 17, 2022, which claims priority to Australian Patent Application Number 2021203154, filed May 17, 2021, the entire disclosures of which are hereby incorporated herein by reference.

TECHNICAL FIELD

The present disclosure relates to a thermal imaging assembly. The thermal imaging assembly includes cleaning functionality and may be used in applications where cameras are prone to being obstructed by, for example, sludge (e.g. a mixture of dust and water). Such applications include a ship loader and unloader for bulk solid material such as coal, mining vehicles and rolling stock vehicles.

BACKGROUND ART

Ship loaders and unloaders often operate at times of the day when vision quality is poor. For example, vision may be impaired by direct sunlight and/or glare, dust, fog, or simply poor light at night time or at dawn or dusk. Such devices may be subject to unforeseen mechanical failures, and in any event the poor light can make general operation difficult.

Thermal imaging cameras may be located on the chute of a ship loading device to allow operators to detect problems, and to provide operators with assistance in poor vision conditions. When used in dusty and moist conditions, such as on the chute of a ship loader, the lens of the thermal imaging camera may be obstructed by sludge (e.g. a mixture of dust and moisture). When this occurs, the ship loader may be moved into a maintenance position to clean the obstructed camera. This may lead to considerable down time and inefficient ship loading.

In this specification, unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

SUMMARY

Disclosed herein is a thermal imaging apparatus. The apparatus may comprise; a housing defining first and second internal chambers spaced along a longitudinal axis of the apparatus, the housing comprising a front wall having a first aperture extending therethrough, a rear wall spaced from the front wall, side walls that connect the front and rear walls, and an internal wall that separates the first and second internal chambers, the internal wall having a second aperture extending therethrough; a thermal imaging camera mounted within the second internal chamber of the housing, the camera comprising a lens that is aligned with the first and second apertures; a gas injection portion connected to the first internal chamber, the gas injection portion comprising a first gas intake channel configured to direct gas into the first chamber; and a fluid injection portion connected to the first internal chamber, the fluid injection portion comprising a fluid intake channel configured to direct fluid towards the camera lens to clean the camera lens. The apparatus is robust and provides an effective cleaning system for a thermal imaging camera used in a dirty and moist environment (e.g. where sludge may settle on the camera lens).

In some forms, the apparatus may further comprise a discharge channel that fluidically connects the first chamber with an external environment, the discharge channel being configured to discharge fluid from the first chamber to the external environment.

In some forms, the discharge channel extends through a lower portion of the housing adjacent the front wall.

In some forms, the front wall, forward portions of the side walls and internal wall define the first chamber, and the internal wall, rear portions of the side walls and rear wall define the second internal chamber.

In some forms, the side walls of the housing comprises: a first top wall, a first bottom wall spaced from the top wall, and a pair of first intermediate side walls that connect the first top wall to the first bottom wall, wherein the first top, first bottom, pair of first intermediate walls and the internal wall define the first internal chamber; a second top wall that extends from first top wall, a second bottom wall that extends from the first bottom wall, and a pair of second intermediate side walls that extend from the pair of first intermediate side walls, wherein the second top, second bottom, pair of second intermediate walls and the internal wall define the second internal chamber.

In some forms, the first gas intake channel extends through one of the pair of first intermediate side walls and connects the first internal chamber to an outside environment.

In some forms the apparatus further comprises a second gas intake channel that extends through one of the pair of first intermediate side walls and connects the first internal chamber to an outside environment.

In some forms, the first and second gas intake channels are disposed in the same first intermediate side wall and spaced from other another.

In some forms, the first gas intake channel is disposed towards the first top wall and the second gas intake channel is disposed towards the first bottom wall.

In some forms, the gas injection portion comprises: a first mount connected to the first gas intake channel; and a second mount connected to the second gas intake channel; the first mount being disposed on an exterior surface of the housing and configured to enable a gas intake hose to be mounted to the housing and allow gas to enter the first gas intake channel, the second mount being disposed on the exterior surface of the housing and configured to enable another gas intake hose to be mounted to the housing and allow gas to enter the second gas intake channel.

In some forms, the fluid injection portion comprises a body that projects from the front face of the housing.

In some forms, the fluid intake channel comprises a first channel that extends along an axis that is substantially perpendicular to the longitudinal axis of the apparatus, and a second channel fluidically connected to the first channel and extending along an axis that forms an acute angle with the longitudinal axis of the apparatus such that fluid that is discharged from the second channel is directed towards the lens of the camera.

In some forms, the body comprises: a first body portion having a substantially uniform cross-sectional diameter and disposed towards a top of the assembly, and a second body portion that is integrally formed with the first body portion and extends towards the first aperture of the front wall, the second body portion having a non-uniform cross-sectional diameter such that the second body portion reduces in width as it extends towards to the first aperture of the front wall.

In some forms, the first channel of the fluid intake channel extends through the first body of the fluid injection portion, and the second channel of the fluid intake channel extends through the second body of the fluid injection portion.

In some forms, the body of the fluid intake portion is integrally formed with the front wall of the housing.

In some forms, the body of the fluid intake portion is mounted to the front wall of the housing.

In some forms, the fluid injection portion comprises a fluid intake mount connected to the fluid intake channel, the fluid intake mount being disposed on a top face of the body and configured to enable a fluid intake hose to be mounted to the body and allow fluid to enter the fluid intake channel.

In some forms, a body of the camera is mounted within the second chamber.

Another embodiment of the thermal imaging apparatus is disclosed. In this embodiment, the apparatus comprises; a housing defining an internal chamber, the housing comprising a front wall having a first aperture extending therethrough, a rear wall spaced from the front wall, side walls that connect the front and rear walls; a thermal imaging camera mounted within the internal chamber of the housing, the camera comprising a lens that is aligned with the first aperture; and a fluid injection portion connected to the internal chamber, the fluid injection portion comprising a fluid intake channel configured to direct fluid towards the camera lens to clean the camera lens.

Also disclosed herein is a thermal imaging system. The system may comprise: a thermal imaging apparatus as described above, a controller, a transmitter configured to wirelessly communicate information to a remote computer system, and a receiver configured to wirelessly receive information from the remote computer system, the controller being configured to receive instructions from the remote computer system and output instructions to the fluid injection portion to allow fluid to enter the fluid intake channel and thereby discharge fluid onto the camera lens.

In some forms, the thermal imaging system further comprises a processor, the processor being configured to process images captured by the thermal imaging camera and output the images via the wireless transmitter to the remote computer system such that an operator is able to view the images on a display of the remote computer system. In another embodiment, for example where wireless communication is not required, communication of information/data between the remote computer system and the thermal imaging display (and/or other components of the system) may not be wireless (e.g. using an interface cable, such as an M12 ethernet cable). In some forms, a junction box of the system may be accessed remotely via 4G interface/network to alter the water spray program intervals.

In some forms, the system further comprises an air compressor, an air intake hose connected between the gas intake channel and the air compressor for injecting air into the gas intake channel, a fluid pump configured to discharge fluid toward via a first water line to the fluid injection portion, and a reservoir configured to hold water, and a second water line connected between the fluid pump and the reservoir for supplying fluid to the fluid pump. In some forms (e.g. when the system is utilised for a vehicle), the pumping system and/or air supply system may form part of the vehicle (e.g. be available for use with the thermal imaging apparatus and system disclosed herein). For example, bleed air from a vehicle air conditioning system may be utilised.

BRIEF DESCRIPTION OF DRAWINGS

Various embodiments/aspects of the disclosure will now be described with reference to the following figures.

DETAILED DESCRIPTION

The Applicant's prior patent, Australian Patent No. 2014101394, the contents of which is incorporated herein by reference, discloses a thermal imaging apparatus with self-cleaning functionality. The thermal imaging apparatus disclosed in AU 2014101394 includes a housing, a thermal imaging camera having a lens, and a passage on the inside of the cover that faces the lens to discharge air across the lens of the camera. The air acts to move obstructions (e.g. as dust) away from the lens. The Applicant has found that the assembly is useful for dry conditions. However, in moist conditions, such as near the ocean in certain situations (e.g. when an on-shore wind is present), the air cushion provided may not prevent sludge from obscuring the lens of the camera.

A thermal imaging assembly that can substantially reduce the risk of, and in some forms prevent, sludge from obscuring the lens of a thermal imaging camera housed within the assembly will now be described with reference to FIGS. 1 to 7. The disclosed thermal imaging assembly can be used for many applications, such as on a spoon of a coal conveyor where an operator needs to see the coal flow when loading coal into a ship, and to monitor a component or apparatus of rolling stock or other vehicle used in a mining environment.

Figure 1:
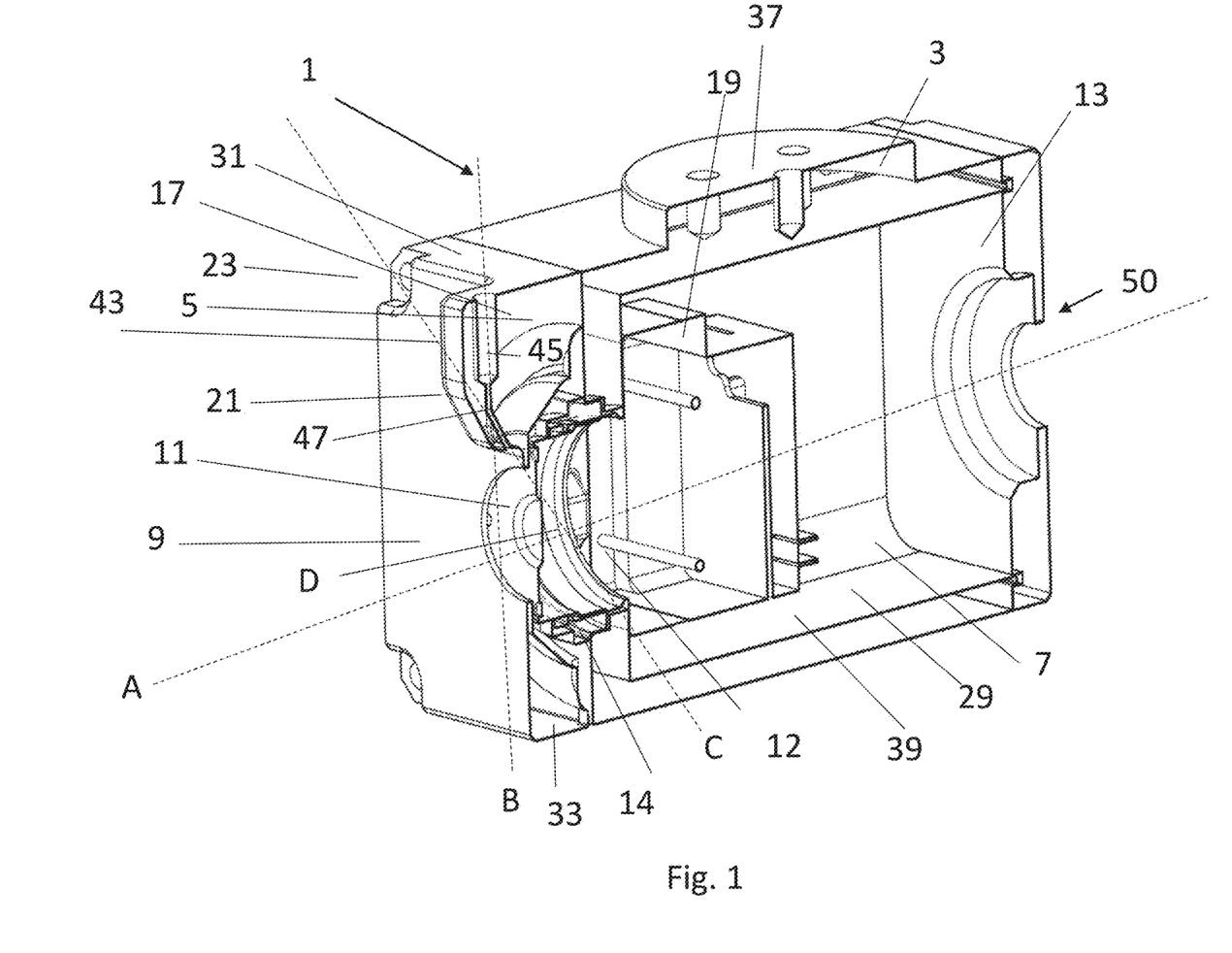
FIG. 1 shows a cross-sectional view through a first embodiment of the disclosed thermal imaging apparatus.
Figure 2:
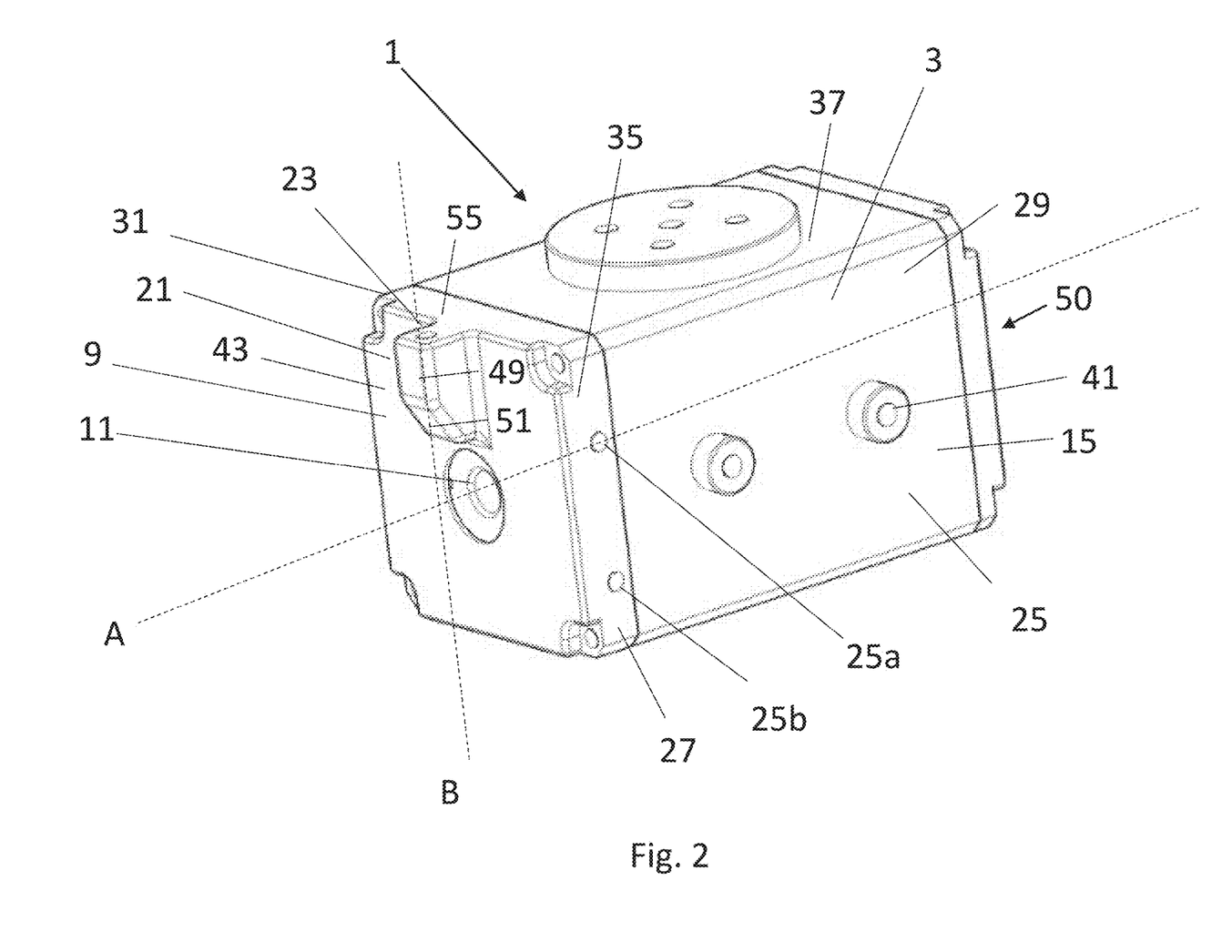
FIG. 2 shows a perspective view of the thermal imaging apparatus shown in FIG. 1.
Figure 3:
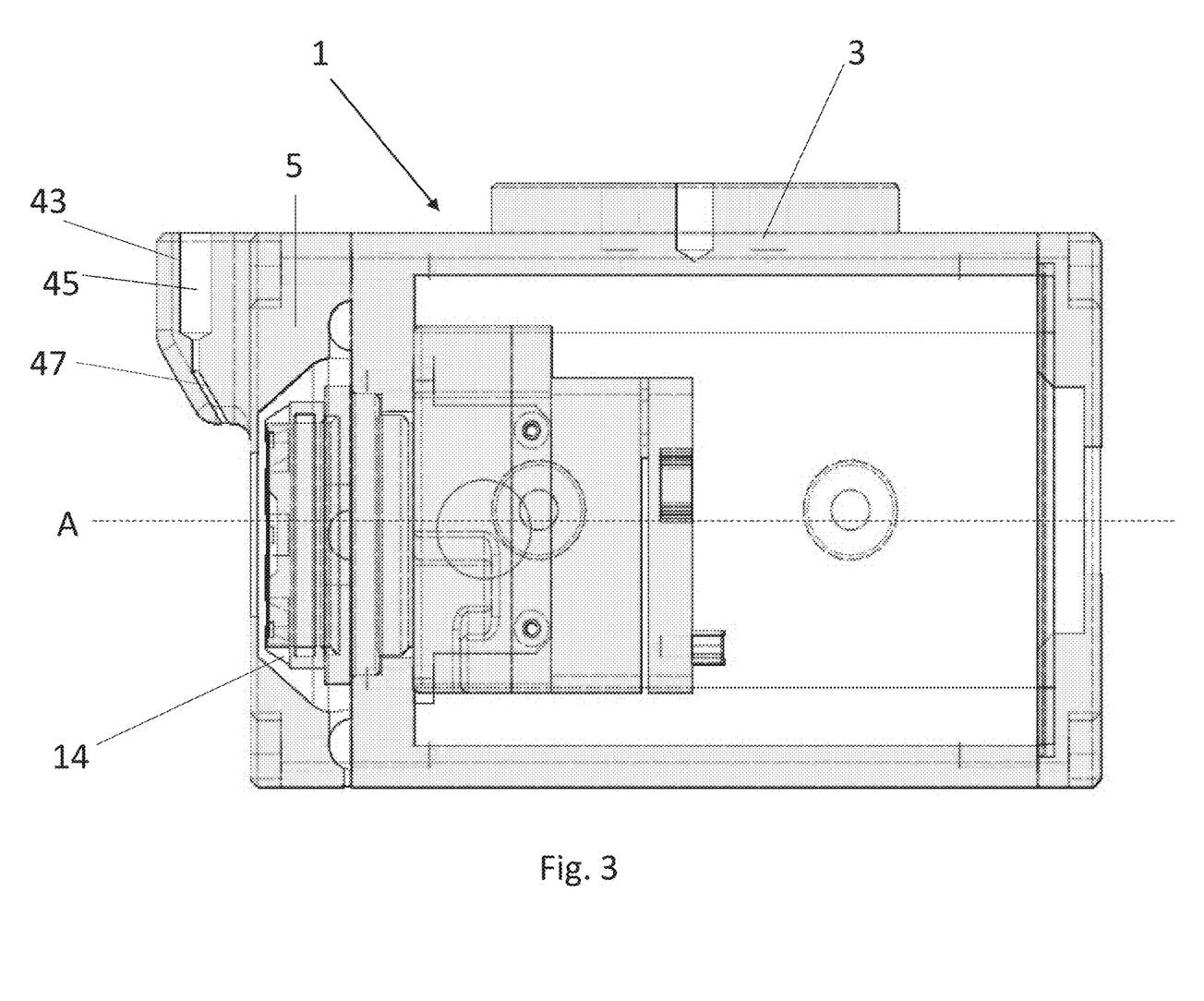
FIG. 3 shows another cross-sectional view of the thermal imaging apparatus shown in FIG. 1.

A thermal imaging apparatus 1 in accordance with a first embodiment of the present disclosure is shown in FIGS. 1 to 3. The apparatus 1 includes a housing 3 that defines a first internal chamber 5 and a second internal chamber 7 that are spaced along a longitudinal axis A of the apparatus 1. The housing includes a front wall 9 having a first aperture 11 extending therethrough. The housing also includes a rear wall 13 spaced from the front wall, side walls 15 that connect the front and rear walls, and an internal wall 17 that separates the first 5 and second 7 internal chambers. The internal wall 17 also has an aperture 12 extending therethrough that is aligned with the first aperture 11.

The assembly 1 includes a thermal imaging camera (not shown) mounted within the second internal chamber of the housing 7. In the detailed embodiment, the thermal imaging camera is a Teledyne FLIR Tau 2. In the detailed embodiment, the second internal chamber 7 includes a camera supporting and mounting structure 19. The camera includes a lens that is aligned with the first 11 and second 12 apertures. In other words, the lens of the camera is aligned with the first 11 and second 12 apertures such that it is able to capture images of an external environment (e.g. the chute of a ship loader for bulk solid material). The second chamber 7 has an IP rating (defines the level of sealing effectiveness of an electrical enclosure against solids and moisture) that is appropriate for the application. For example, when utilised to monitor the chute of a ship loading apparatus for coal, the second chamber 7 may have an IP rating of IP67. Advantageously, this arrangement allows for all of the electrical components of the apparatus to be housed within a sealed enclosure, protected from the ingress of dust and moisture, while the lens of the housed camera is exposed within the first chamber 5 for cleaning purposes. In the detailed embodiment, a castellated nut 14 (see also FIG. 3) is provided to help securely fit the lens 11 into the second chamber 7 opening. A first o-ring is positioned on the inside of the nut 14 such that it sits against the camera lens. A second o-ring is mounted on the front surface of the camera housing. Together, the castellated nut 14, first o-ring and second-o-ring seals the second chamber 7 and assists to provide the IP67 rating. The castellated nut 14 provides a second function, which is discussed in further detail below.

The apparatus 1 includes a fluid injection portion 21 connected to the first internal chamber 5. The fluid injection portion includes a fluid intake channel 23 configured to direct fluid (e.g. water) towards the lens of the camera (i.e. towards the second aperture into which the lens of the camera extends from the second internal chamber 7). The apparatus also includes a discharge channel (not shown) that fluidically connects the first chamber 5 with an external environment. The discharge channel is configured to discharge fluid from the first chamber to the external environment. The discharge channel extends through a lower portion of the housing (e.g. through a bottom wall 33 of the housing 3) adjacent the front wall 11. In the event that sludge is cleaned from the lens of the camera, the fluid that is discharged from the first chamber 5 via the discharge channel may also include solids entrained in the injected fluid (e.g. a coal dust and water mixture). In the event that the pressure differential is appropriate, gas (e.g. air) may also be discharged through the channel. Typically, a significant majority (e.g. 90%) of gas and fluid is discharged through the first aperture 11 at the front of the housing, as this aperture has a larger diameter and therefore provides less resistance relative to the discharge channel in the detailed embodiment. However, the discharge channel is useful, in that it allow for fluid and sludge that may pool in the lower portion of the first chamber 5 to be discharged via gravity from the first chamber 5.

In the detailed embodiments, the apparatus includes a single fluid injection system that includes a single centrally located intake channel. As will be apparent to the skilled addressee, more than one fluid injection system may be included in the apparatus, and each fluid injection system may include more than one intake channel. Further, the one or more intake channels may not be centrally located. For example, in one embodiment, the apparatus may include a pair of fluid injection systems that are disposed on opposite sides (e.g. top and bottom, or on opposing sides) of the apparatus. In one embodiment, the one or more fluid injection systems may each include more than one intake channel (e.g. a pair of intake channels).

The apparatus also includes a gas injection portion 25 connected to the first internal chamber 5. In the detailed embodiment, the gas injection portion 25 includes first 25a and second 25b gas intake channels configured to direct gas (e.g. air) into the first chamber 5 and across the lens of the camera. The castellated nut 14 (see FIGS. 1 and 3) assists to create an air cushion by directing the gas that enters the chamber 5 over the lens face and out the front of the chamber 5 via first aperture 11. As will be apparent to the skilled addressee, one or more gas intake channels may be included. As will also be apparent to the skilled addressee, the location of the one or more gas intake channels may be different to that described in the detailed embodiment (disposed on one side of the apparatus). For example, the gas intake channel (s) may be disposed at the top, bottom, or either side of the apparatus. The Applicant has determined that splitting the incoming gas inlet (e.g. a split hose from an air compressor) and injecting that air above and below the lens provides an optimal cleaning arrangement.

The combination of the gas and fluid injection and extraction systems together provide an effective cleaning system for the lens of the thermal imaging camera. The gas injection system creates an air cushion by passing air across the lens. Air passes across lens, and acts to move any objects in the air, such as dust, away from the lens, assisting to provide a clear image from the camera. In the event that the apparatus is operating in a moist environment (e.g. near the ocean where a prevailing wind blows a mixture of dust and water towards the camera) and a sludge forms on the lens of the camera, this may be simply removed by injecting water via the fluid intake channel 23 onto the lens of the camera to remove the sludge from the lens. The removed sludge is then able to be extracted from the first chamber 5 via the discharge channel and through the first aperture 11. Advantageously, the fluid and gas injection and extraction systems do not include any electrical or moving components in the vicinity of the apparatus. This results in the apparatus being a robust device (e.g. no exposed electrical or mechanical components that could be knocked off) and reduces risk in certain environments (e.g. the electrical components are able to be safely housed within the sealed second chamber of the housing).

In this first embodiment of the present disclosure, the fluid injection 21 and gas injection 25 portions of the apparatus 1 are integrally formed with the front wall 9 of the housing 1. This allows for the fluid injection 21 and gas injection 25 portions and front wall 9 of the housing 3 to be formed as a single unit that can be mounted to the front face of the apparatus 1. This arrangement is advantageous for maintenance purposes, as it allows for the front of the apparatus (including to gas and fluid injection portions) to be removed as a single component without exposing the sealed second internal cavity. For example, this may be required in the event that the discharge channel is blocked, or to access the lens of the camera if required The first embodiment of the present disclosure will now be described in further detail. The front wall 9 of the housing 3, forward portions 27 of the side walls 25 and internal wall 17 define the first chamber 5 of the housing 3. The internal wall 17, rear portions 29 of the side walls 15 and rear wall 13 define the second internal chamber 7. The side walls 15 of the housing 3 include a first top wall 31, a first bottom wall 33 spaced from the top wall 31, and a pair of first intermediate side walls 35 that connect the first top wall 33 to the first bottom wall 35. Together the first top 31, first bottom 33, pair of first intermediate walls 35 and the internal wall 17 define the first internal chamber 5.

The housing 3 also includes a second top wall 37 that extends from first top wall 31, a second bottom wall 39 that extends from the first bottom wall 33, and a pair of second intermediate side walls 41 that extend from the pair of first intermediate side walls 35. Together the second top 37, second bottom 39, pair of second intermediate walls 41 and the internal wall 17 define the second internal chamber 7. In this embodiment, the second top wall 37 is a mounting potion that enables the assembly 1 to be mounted in use. The mounting portion includes several apertures that are configured receive fasteners to mount the assembly 1 to another object. In another embodiment, the mounting portion is disposed on a side wall of the apparatus (see FIG. 7, which shows mounting portions 81*a-b* disposed on the side wall of the apparatus 1). In this embodiment, mounting portions 81*a-b* are disposed on each side wall of the apparatus. This enables the assembly to be mounted to the left or right side of the chute of a ship loader, and enables the assembly to remain upright in use.

The first gas intake channel 25*a* extends through one of the pair of first intermediate side walls 35 and connects the first internal chamber 5 to an external environment (i.e. the environment external to the assembly 1). In the detailed embodiment, the second gas intake channel 25*b* extends through one of the pair of first intermediate side walls 35 and connects the first internal chamber 5 to the external environment. The first 25*a* and second 25*b* gas intake channels are disposed in the same first intermediate side wall 35 and spaced from other another such that the first channel 25*a* directs air above the camera lens in use, and the second channel 25*b* directs air below the camera lens in use. In the detailed embodiment, the assembly includes third and fourth gas intake channels that are identical to channels 25*a-b* and are disposed on the other side (obscured from view in FIG. 2) of the assembly. This enables the assembly to be mounted adjacent the right or left hand side of an object (e.g. a chute of a ship loader), and is particularly useful when used in conjunction with the side mounts 81*a-b* shown in FIG. 7. The channels that are not used are able to be blanked in use.

The gas injection portion a first mount (not shown) connected to the first gas intake channel 25*a* and a second mount (not shown) connected to the second gas intake channel 25*b*. The first mount is disposed on an exterior surface of the housing (on the first side wall 37 adjacent the first intake channel 25*a*) and is configured to enable a gas intake hose to be mounted to the housing and allow gas to enter the first gas intake channel. Similarly, the second mount is also disposed on the exterior surface of the housing (on the first side wall 37 adjacent the second intake channel 25*b*) and configured to enable another gas intake hose to be mounted to the housing and allow gas to enter the second gas intake channel 25*b*.

The fluid injection portion 21 includes a body 43 that projects from the front face 9 of the housing 3. The fluid intake channel 23 comprises a first channel 45 that extends along an axis B that is substantially perpendicular to the longitudinal axis A of the apparatus 1. The fluid injection portion 21 also includes a second channel 47 fluidically connected to the first channel 45 and extending along an axis C that forms an acute angle D (approximately 45 degrees in the detailed embodiment) with the longitudinal axis A of the apparatus such that fluid that is discharged from the second channel 47 is directed towards the lens of the camera.

The body 43 of the fluid injection portion 21 includes a first body portion 49 having a substantially uniform cross-sectional diameter and disposed towards a top 50 of the assembly (i.e. towards the top surface of the assembly in use). In the detailed embodiment, the top surface of the first body portion is flush with the top surface of the adjacent housing (i.e. does not project above the top surface of the housing). The body 43 of the fluid injection portion 21 also includes a second body portion 51 that is integrally formed with the first body portion 49 and extends from the first body portion 49 towards the first aperture 11 of the front wall 9. In the detailed embodiment, the second body portion 51 has a non-uniform cross-sectional diameter (i.e. is tapered) such that the second body portion 51 reduces in width as it extends towards to the first aperture 11 of the front wall 9 (i.e. the second body portion 51 tapers such that the width of second body portion 51, as is measured along an axis that is parallel to the longitudinal axis A, towards the first body portion 49 is greater than the width of the second body portion 51 that is disposed away from the first body portion 49). As will be evidence to the skilled addressee, alternative shapes could be used (e.g. the second body portion could be non-tapered, circular, etc). However, the Applicant has determined that the tapered portion provides an optimal arrangement in that it provides sufficient width for the angled second channel 47 and does not obscure the vision of the camera.

The first channel 45 of the fluid intake channel 23 extends through the first body portion 49 of the fluid injection portion 21. The second channel 47 of the fluid intake channel 23 extends through the second body portion 51 of the fluid injection portion 21.

In the embodiment described with respect to FIGS. 1 to 3, the body 43 of the fluid intake portion 21 is integrally formed with the front wall 9 of the housing. In an alternate embodiment, shown in FIG. 4, the body 43 of the fluid intake portion 21 is mounted to the front wall 9 of the housing and extends across the width of the housing. In both embodiments, the front face 9 of the housing 3 is mounted to the remainder of the housing 3 via a mounting means (e.g. four bolts that are disposed in each corner of the front face 9).

Figure 4:
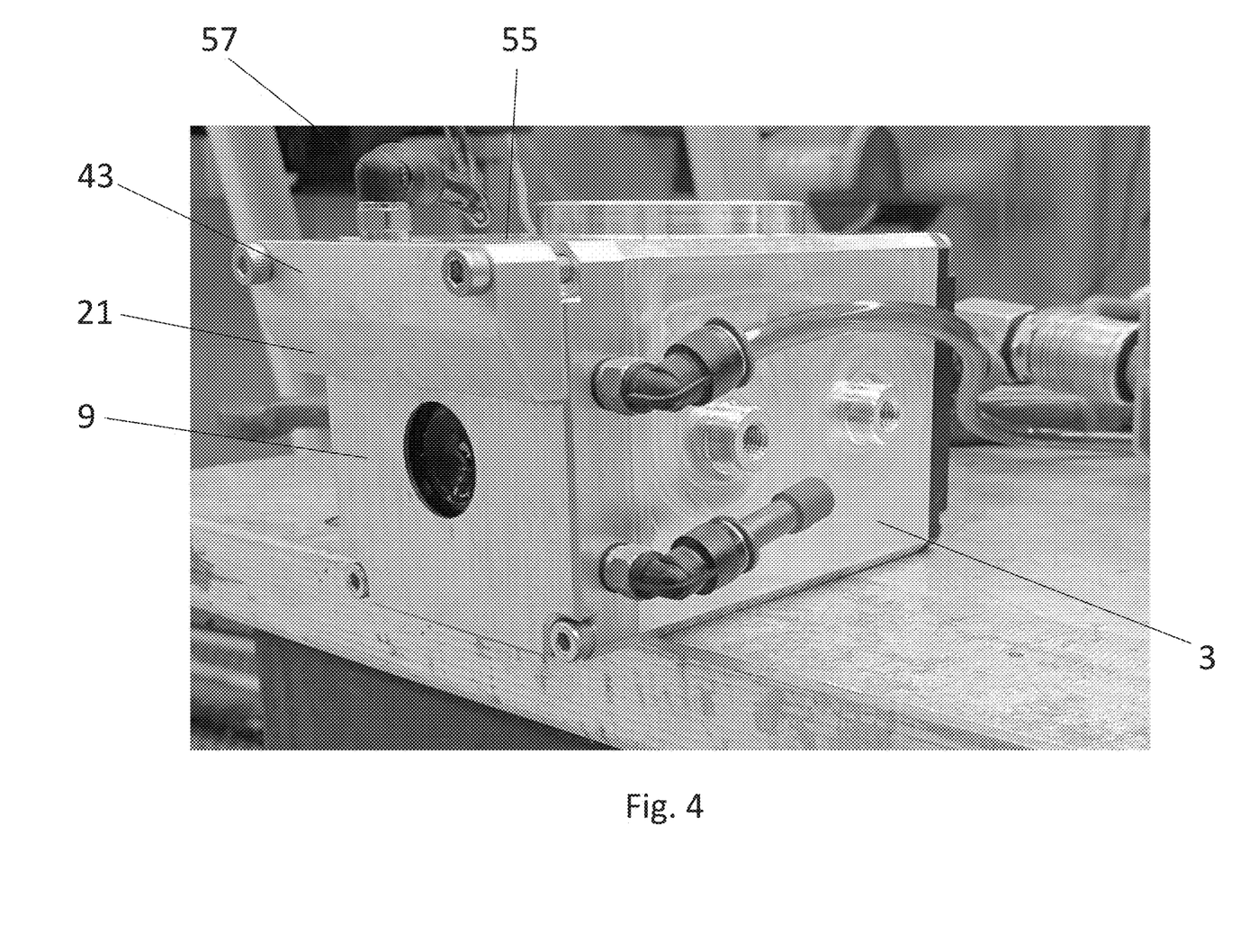
FIG. 4 shows a perspective view of a second embodiment of the disclosed thermal imaging apparatus.

As is shown in FIG. 4, the fluid injection portion 21 includes a fluid intake mount 53 connected to the fluid intake channel 23, the fluid intake mount 53 being disposed on a top face 55 of the body 43 and configured to enable a fluid intake hose 57 to be mounted to the body 43 and allow fluid to enter the fluid intake channel 23.

Figure 5:
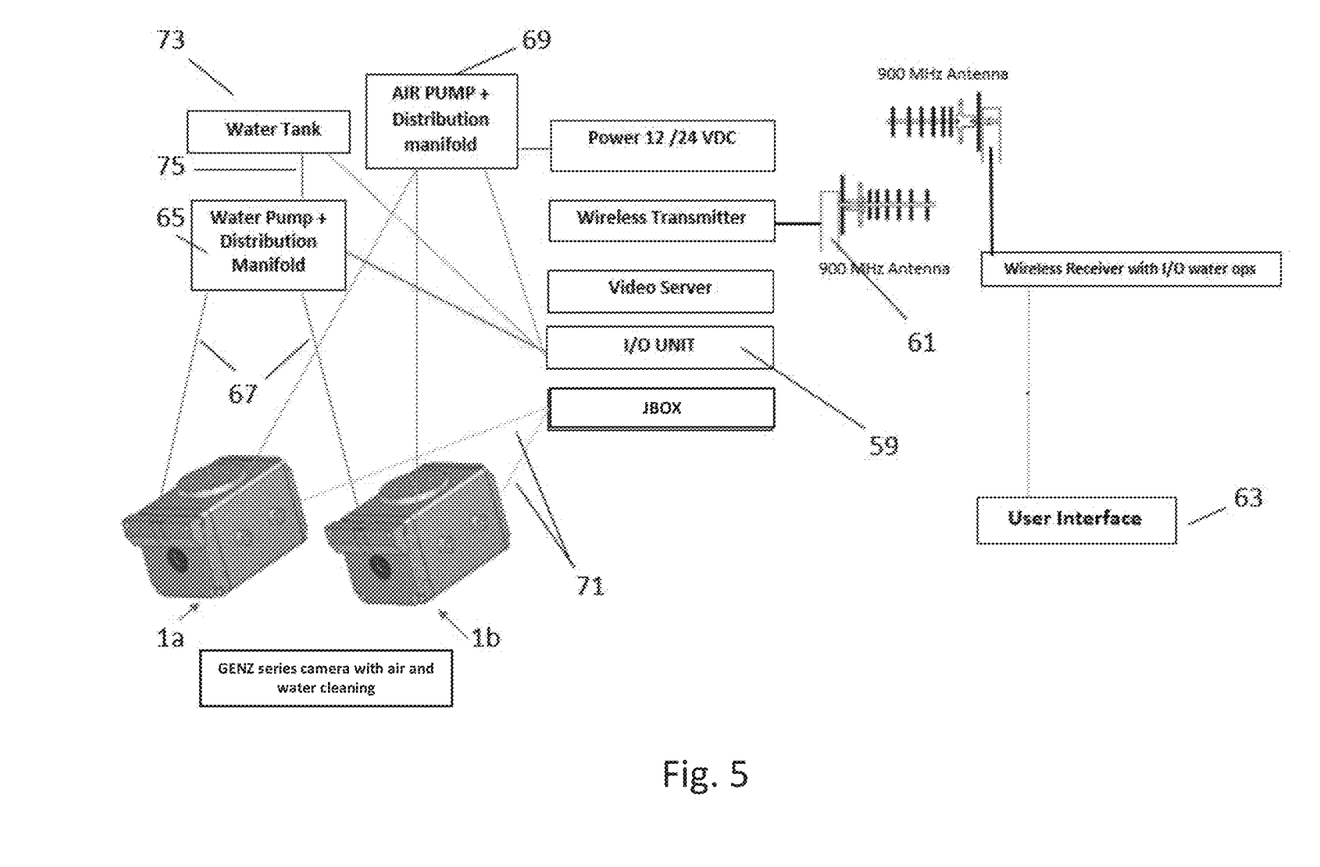
FIG. 5 shows a schematic view of a system that incorporates two thermal imaging apparatus' shown in FIG. 4.

A schematic of the system that operates with the thermal imaging assembly 1 is shown in FIG. 5. The system shown includes two thermal imaging assemblies (1*a* and 1*b*). The embodiment of the assembly included accords with the second embodiment described above (i.e. that shown in FIG. 4). As will be apparent to the skilled addressee, the first embodiment of the assembly (i.e. that described with respect to FIGS. 1-3) could also form part of the system. Also, as will be apparent to the skilled addressee, any number of imaging assemblies could be used in the system described below, with appropriate adjustments.

The system includes a controller 59 (referred to as an input/output module in FIG. 5), a transmitter 61 configured to wirelessly communicate information to a remote computer system 63, and a receiver (forms part of the transmitter 61 in the detailed embodiment) configured to wirelessly receive information from the remote computer system 63. As will be apparent to the skilled addressee, in another embodiment instructions may be communicated via a wired network. In the detailed embodiment, the transmitter 61 is shown as a 900 MHz antenna. As will be apparent to the skilled addressee, other embodiments may include a different antenna.

The controller 59 is configured to receive instructions from the remote computer system 63 and output instructions to a water pump and distribution manifold 65 to inject water into a water line 67 (two water lines are shown in FIG. 5) that directs water to the fluid intake channel of the fluid injection portions 21 of the assemblies 1*a*, 1*b* to thereby discharge fluid onto the camera lens of each of the assemblies 1*a*, 1*b* for cleaning purposes. For example, in the event that the image displayed on a user interface of the remote computer system is obscured by sludge, the operator is able to interact with the remote computer system (e.g. by pressing a button) such that a command is sent to the controller 59, which in turn instructs the water pump and distribution manifold 65 to turn on, or to open one or more valves of the manifold, and thereby inject water into the water lines 67 (e.g. one or both water lines 67).

As will be apparent to the skilled addressee, many control methodologies are able to be implemented with regards to the injection of water for cleaning purposes. In the detailed embodiment, the water injection system is not constantly operational (i.e. water is not constantly injected onto the screen of the lens). Doing so may obscure the vision of the camera. The water injection system could be controlled by a timer (e.g. one or more 5 ms water injection pulses every minute) or by the operator. The Applicant has determined that configuring the assembly to provide a series of 4-5 5 ms water injection pulses for cleaning purposes is particularly useful. This configuration enables material on the lens to be effectively loosened without interfering with the vision of the camera.

In one embodiment, the system may be configured to determine when the image captured by the camera(s) is obscured (e.g. by using a model trained to analyse the captured images) and then to output instructions to operate the water injection system, or may include an additional sensor that, with an associated processor, is configured to determine if the lens is obscured by sludge on the surface of the lens. The system includes a reservoir (e.g. a stainless steel tank that is appropriately sized for the application) 73 configured to hold water, and a water intake hose 75 connected between the water pump and distribution manifold 65 and the reservoir 75 for supplying water to the manifold 65.

The system also includes an air compressor 69, an air intake line 71 (two air intake lines are shown in FIG. 5 for the two assemblies 1*a*, 1*b*) connected between the gas intake channel of the assemblies and the air compressor 69 for injecting air into the gas intake channel. Similar to the fluid injection system, the skilled addressee will appreciate that many control methodologies are able to be implemented with regards to the injection of air. In the detailed embodiment, air is injected continuously to produce an air cushion around the lens to inhibit dust from entering the first chamber of the assembly.

Figure 6:
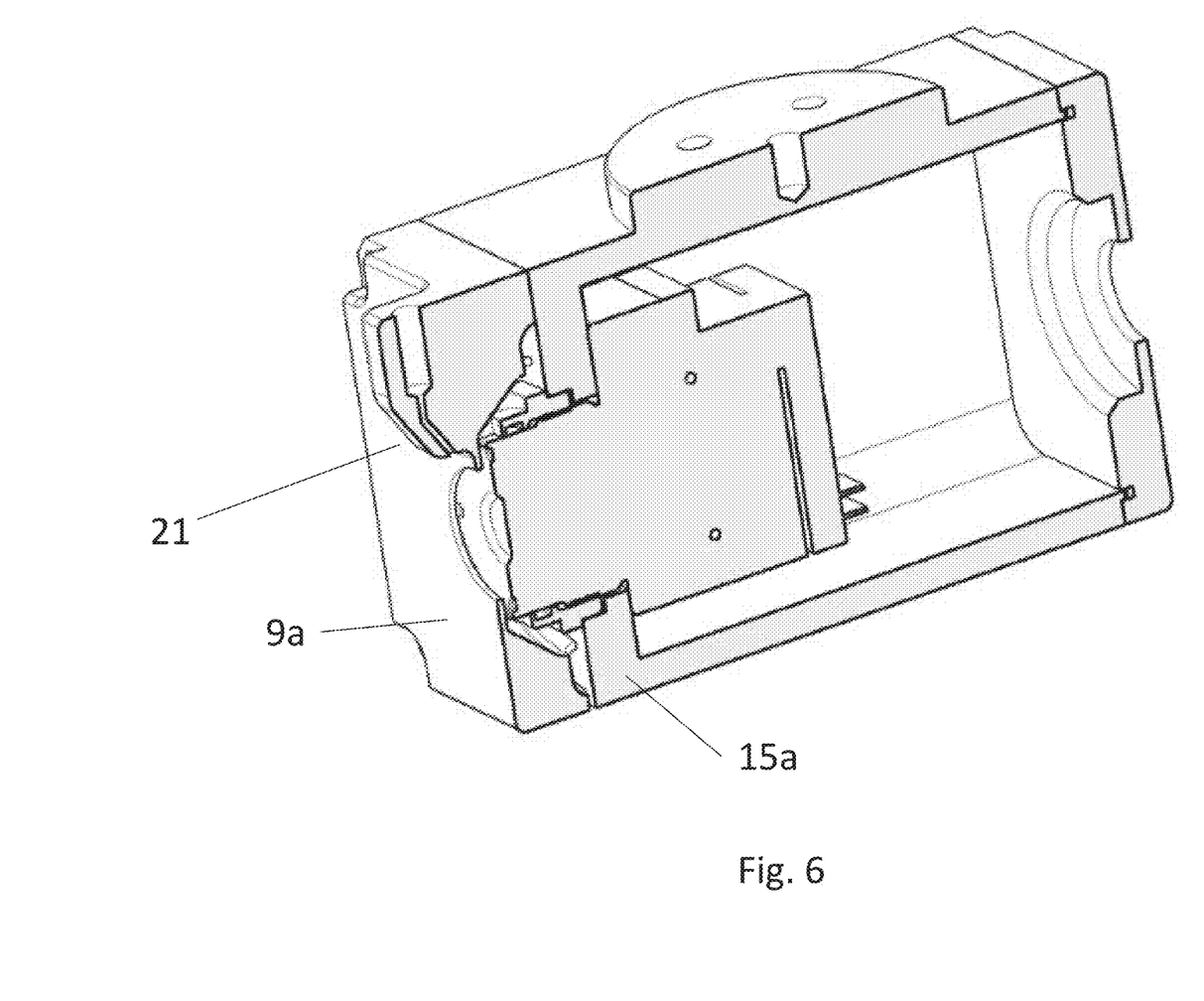
FIG. 6 shows a cross-sectional view of a third embodiment of the disclosed thermal imaging apparatus.
Figure 7:
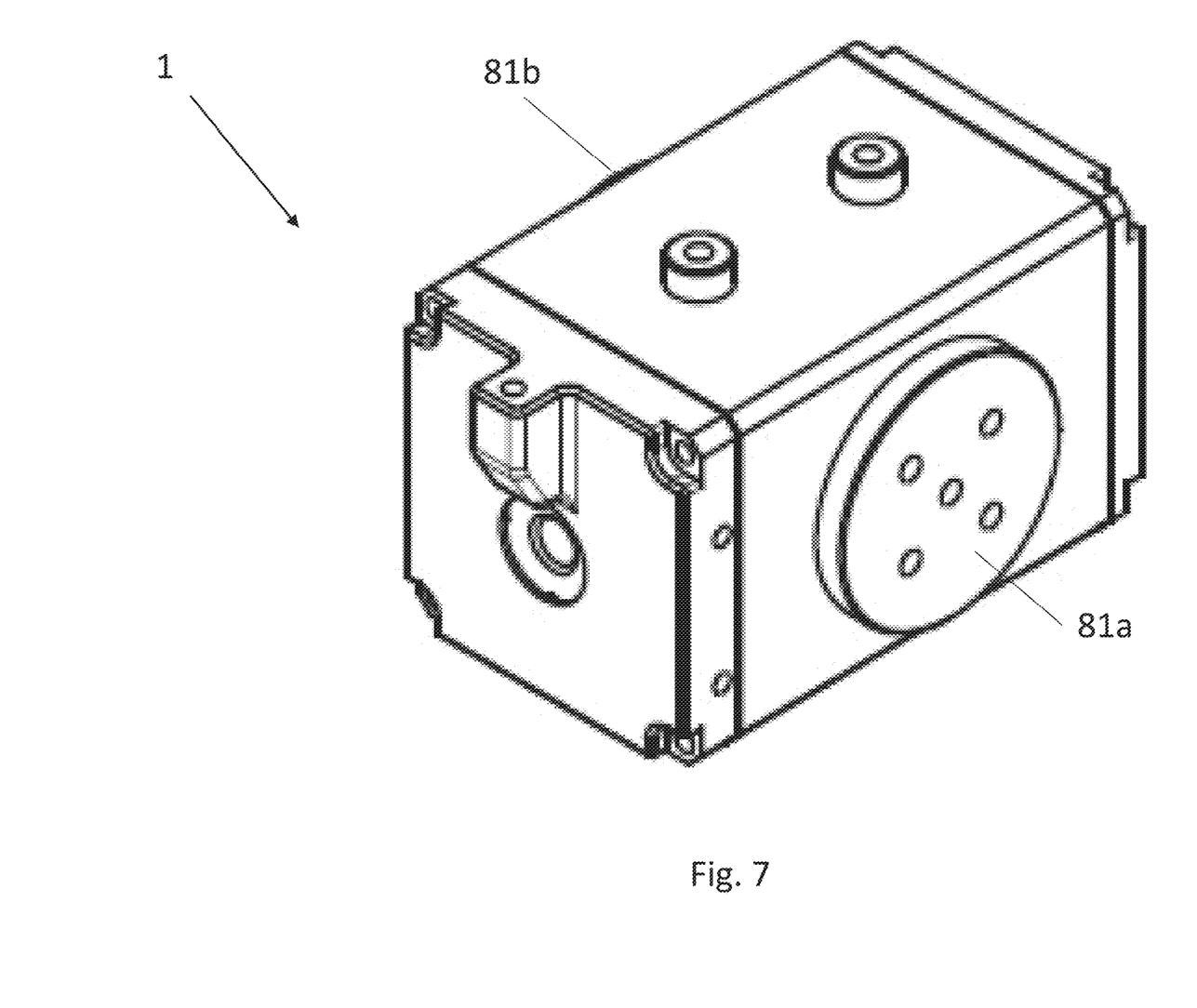
FIG. 7 shows a perspective view of a fourth embodiment of the disclosed thermal imaging apparatus.

A third embodiment of the present disclosure will now be described with respect to FIG. 6. FIG. 6 shows a perspective cross sectional view through the thermal imaging apparatus. In this embodiment, the housing does not include the first chamber or the gas injection system described with respect to FIGS. 1-5. Otherwise, third embodiment is substantially identical to the embodiments described above with respect to FIGS. 1-5, with minor differences discussed below. In this third embodiment, the front wall 9*a* (corresponds with front wall 9 shown in FIGS. 1-3) sits flush against the internal wall 15*a* (internal wall 15 shown in FIGS. 1-3). In another embodiment, the internal and front walls may be integrally formed with one another (i.e. the internal and front walls are one and the same). In the detailed third embodiment, the fluid injection system 21*a* is the same as the first embodiment (i.e. FIGS. 1-3). The intake channel(s) of the fluid injection system 21*a* direct fluid towards the camera lens to clean the camera lens (i.e. the fluid is sprayed directly onto the surface of the camera lens for cleaning purposes). As will be apparent to the skilled addressee, the fluid injection system may be as otherwise described above (e.g. mounted as a separate component to the front face of the housing, extend across the width of the housing, etc). As there is no first chamber, there is no requirement for a discharge passage. This is a useful embodiment in the event that an air compressor and manifold is not available and a robust cleaning system is still required to clean the camera lens. With appropriate adjustments (e.g. no requirement of compressed air and the associated components), the third embodiment of the assembly is also able to be utilised in the system described above with respect to FIG. 5.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The invention claimed is:

1. A thermal imaging apparatus comprising;
   a housing defining first and second internal chambers spaced along a longitudinal axis of the thermal imaging apparatus, the housing comprising a front wall having a first aperture extending therethrough, a rear wall spaced from the front wall, side walls that connect the front and rear walls, and an internal wall that separates the first and second internal chambers, the internal wall having a second aperture extending therethrough;
   a thermal imaging camera mounted within the second internal chamber of the housing, the thermal imaging camera comprising a lens that is aligned with the first and second apertures and that extends into the first internal chamber via the second aperture for cleaning purposes;
   a gas injection portion connected to the first internal chamber, the gas injection portion comprising a first gas intake channel configured to direct gas into the first internal chamber and across the lens of the thermal imaging camera; and
   a fluid injection portion connected to the first internal chamber, the fluid injection portion comprising a fluid intake channel configured to direct fluid towards the lens of the thermal imaging camera to clean the lens.

2. The thermal imaging apparatus of claim 1, further comprising a discharge channel that fluidically connects the first internal chamber with an external environment, the discharge channel being configured to discharge fluid from the first internal chamber to the external environment.

3. The thermal imaging apparatus of claim 2, wherein the discharge channel extends through a lower portion of the housing adjacent the front wall.

4. The thermal imaging apparatus of claim 1, wherein the front wall, forward portions of the side walls and the internal wall define the first internal chamber, and the internal wall, rear portions of the side walls and the rear wall define the second internal chamber.

5. The thermal imaging apparatus of claim 1, wherein the side walls of the housing comprises:
   a first top wall, a first bottom wall spaced from the top wall, and a pair of first intermediate side walls that connect the first top wall to the first bottom wall, wherein the first top, first bottom, pair of first intermediate walls and the internal wall define the first internal chamber;
   a second top wall that extends from first top wall, a second bottom wall that extends from the first bottom wall, and a pair of second intermediate side walls that extend from the pair of first intermediate side walls, wherein the second top, second bottom, pair of second intermediate walls and the internal wall define the second internal chamber.

6. The thermal imaging apparatus of claim 5, wherein the first gas intake channel extends through one of the pair of first intermediate side walls and connects the first internal chamber to an outside environment.

7. The thermal imaging apparatus of claim 6, further comprising a second gas intake channel that extends through one of the pair of first intermediate side walls and connects the first internal chamber to an outside environment.

8. The thermal imaging apparatus of claim 7, wherein the first and second gas intake channels are disposed in the same first intermediate side wall and spaced from one another.

9. The thermal imaging apparatus of claim 8, wherein the first gas intake channel is disposed towards the first top wall and the second gas intake channel is disposed towards the first bottom wall.

10. The thermal imaging apparatus of claim 9, wherein the gas injection portion comprises:
   a first mount connected to the first gas intake channel; and
   a second mount connected to the second gas intake channel;
   the first mount being disposed on an exterior surface of the housing and configured to enable a gas intake hose to be mounted to the housing and allow gas to enter the first gas intake channel,
   the second mount being disposed on the exterior surface of the housing and configured to enable another gas intake hose to be mounted to the housing and allow gas to enter the second gas intake channel.

11. The thermal imaging apparatus of claim 1, wherein the fluid injection portion comprises a body that projects from the front wall of the housing.

12. The thermal imaging apparatus of claim 11, wherein the fluid intake channel comprises a first channel that extends along an axis that is substantially perpendicular to the longitudinal axis of the thermal imaging apparatus, and a second channel fluidically connected to the first channel and extending along an axis that forms an acute angle with the longitudinal axis of the thermal imaging apparatus such that fluid that is discharged from the second channel is directed towards the lens of the thermal imaging camera.

13. The thermal imaging apparatus of claim 12, wherein the body of the fluid injection portion comprises:
   a first body portion having a substantially uniform cross-sectional diameter and disposed towards a top of the thermal imaging apparatus, and
   a second body portion that is integrally formed with the first body portion and extends towards the first aperture of the front wall, the second body portion having a non-uniform cross-sectional diameter such that the second body portion reduces in width as the second body portion extends towards the first aperture of the front wall.

14. The thermal imaging apparatus of claim 13, wherein the first channel of the fluid intake channel extends through the first body portion of the body of the fluid injection portion, and the second channel of the fluid intake channel extends through the second body portion of the body of the fluid injection portion.

15. The thermal imaging apparatus of claim 14, wherein the body of the fluid injection portion is integrally formed with the front wall of the housing.

16. The thermal imaging apparatus of claim 14, wherein the body of the fluid injection portion is mounted to the front wall of the housing.

17. The thermal imaging apparatus of claim 11, wherein the fluid injection portion comprises a fluid intake mount connected to the fluid intake channel, the fluid intake mount being disposed on a top face of the body of the fluid injection portion and configured to enable a fluid intake hose to be mounted to the body and allow fluid to enter the fluid intake channel.

18. The thermal imaging apparatus of claim 1, wherein a body of the thermal imaging camera is mounted within the second chamber.

19. A thermal imaging system comprising:
   the thermal imaging apparatus of claim 1;
   a controller;
   a transmitter configured to wirelessly communicate information to a remote computer system; and
   a receiver configured to wirelessly receive information from the remote computer system,
   the controller being configured to receive instructions from the remote computer system and output instructions to the fluid injection portion to allow fluid to enter the fluid intake channel and thereby discharge fluid onto the lens of the thermal imaging camera.

20. The thermal imaging system of claim 19, further comprising a processor configured to process images captured by the thermal imaging camera and output the images via the transmitter to the remote computer system such that an operator is able to view the images on a display of the remote computer system.

* * * * *